Feb. 17, 1970    A. KOBLIN ET AL    3,495,440
AIR SAMPLER DEVICES
Filed April 23, 1968

INVENTORS
Abraham Koblin
Alfred L. Woolridge
Robert W. Dorsey

BY Harry M. Saragovitz
Edward J. Kelly, Herbert Berl
& Bernard J. Ohlendorf
ATTORNEYS

United States Patent Office

3,495,440
Patented Feb. 17, 1970

3,495,440
AIR SAMPLER DEVICES
Abraham Koblin, Pikesville, and Alfred L. Woolridge and Robert W. Dorsey, Baltimore, Md., assignors to the United States of America as represented by the Secretary of the Army
Filed Apr. 23, 1968, Ser. No. 723,469
Int. Cl. G01n *31/00;* B01d *47/02*
U.S. Cl. 73—28                                                    9 Claims

ABSTRACT OF THE DISCLOSURE

A bubbler type absorber for monitoring low concentration aerosol particles and vapor in air comprising an air inlet means, an absorption chamber means, a means to create turbulent flow within the absorption chamber means, and air exhaust means.

DEDICATORY CLAUSE

The invention described herein may be manufactured, used, and licensed by or for the Government for governmental purposes without the payment to us of any royalty thereon.

Our invention relates to an improved bubbler type absorber for use in determining toxic aerosol particles and vapor and the amount thereof in the atmosphere, and for separating aerosol particles.

The dissemination of materials in the atmosphere as aerosol clouds is regularly performed both commercially and militarily, and techniques and apparatus are necessary to monitor the existence and concentration of such vapors and aerosol particles. While bubbler type absorbers, such as disclosed in U.S. Patent No. 3,001,402, have been utilized in the prior art to ascertain the existence and concentration of vapor in an aerosol cloud and to separate the vapor present from the aerosol particles, the prior art bubblers performed satisfactorily only when a high concentration of vapor and aerosol particles was present. This problem with the prior art bubblers existed due to the limited surface area presented by the absorption liquid utilized to absorb the vapor. Thus, our invention was conceived and reduced to practice to solve the above problem and provide a technique and apparatus which caused a large surface area of absorption liquid to be presented as a result of the creation of turbulent flow. The solution of the problem enabled the highly efficient monitoring of low vapor and aerosol particle concentrations in the atmosphere. For comparison purposes, the prior art bubblers would monitor vapors and aerosol particles of no lower concentration than 10 micrograms of vapor per liter of sample, whereas our invention will monitor vapors and aerosol particles of the same composition of a concentration as low as 0.3 microgram of vapor and aerosol particle per liter of sample. The comparisons were made in controlled atmospheres of known concentration.

A principal object of our invention is to provide a highly efficient means for determining low concentration aerosol particles and vapor in the atmosphere.

A further object of our invention is to provide a highly efficient means for determining low concentration aerosol particles and vapor in the atmosphere by providing structures which will produce turbulent flow.

Other objects of our invention will be obvious or will appear from the specification hereinafter set forth.

Our invention and FIGURES 1 and 2 will now be described in detail as follows.

Figure 1:
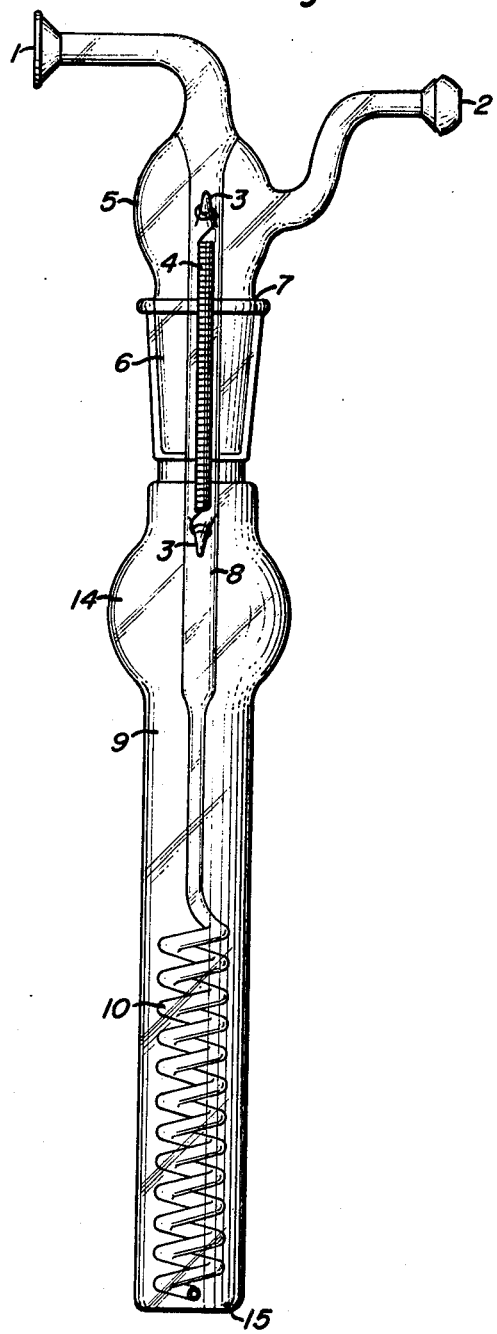
FIGURE 1 is a view of our absorber utilizing a coil structure to create turbulent flow.
Figure 2:
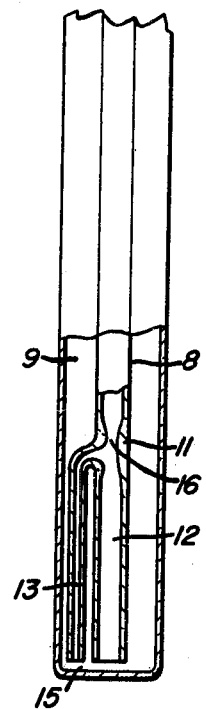
FIGURE 2 is a view of an alternative embodiment of our absorber utilizing a venturi structure to create turbulent flow.

The two structures shown in FIGURES 1 and 2 are identical in all respects except for coil structure 10 in FIGURE 1 and venturi structure 11 in FIGURE 2. Accordingly, the embodiment shown in FIGURE 2 has been broken off below trap 14, utilized for wash down purposes, etc., to show the alternative venturi structure only in FIGURE 2. Air, aerosol particle, and vapor inlet 1 is connected to any conventional air sampling device, such as a cone and probe as described in U.S. Patent No. 3,001,402. The vacuum intake means to sample, absorption medium, and the analysis of absorbed vapor utilizing our absorber are the same as in prior art devices and as described in U.S. Patent No. 3,001,402. In our FIGURE 1, inlet tube 8 is integral with air exhaust chamber 5. Chamber 5 terminates in a tapered, ground glass joint 6 which mates within ground glass opening 7; the opening 7 being at the opposite end of closed end 15 of absorption chamber 9. Joint 6 is retained within opening 7 by means of spring 4 fastened to projections 3. Suitable absorption liquid, as described in U.S. Patent No. 3,001,402, is placed in chamber 9 of such volume as to remain below coil 10. While coil 10 is shown to have twelve turns, the number of turns can be chosen to suit any size apparatus and space requirements necessitated by a given application. A turbulent flow is imparted to the stream containing air, vapor, and aerosol particles entering coil 10 from inlet tube 8, the turbulent flow being induced by the centrifugal force created by the fluid flow through the turns of coil 10. The turbulent air, aerosol particle, and vapor stream in turn impart, a turbulent stream to the absorption liquid below coil 10, and the turbulent flow of the fluids results in an extremely large surface area being presented for collection of aerosol particles within the coil and for highly efficient vapor absorption by the absorption liquid. Such efficient absorption enables the monitoring of low concentration aerosol particles and vapors in the atmosphere. Air with the aerosol particles and vapor now removed leaves coil 10 and is exhausted by means of vacuum through outlet 2 in the conventional manner as described in U.S. Patent No. 3,001,402.

As stated above, the embodiment shown in FIGURE 2 is exactly the same and operates in the same manner as the embodiment shown in FIGURE 1 except for the venturi structure in FIGURE 2. Accordingly, the discussion of FIGURE 2 need only describe the operation regarding the venturi structure. A low pressure area is created below venturi 16 which causes the liquid absorbent within absorbing chamber 9 to be drawn up the venturi return tube 13 and to be injected into scrubbing chamber 12. The high velocity air, aerosol particles, and vapor flow entering the venturi structure 11 from inlet tube 8 disperses the absorbent as an aerosol and also creates a high degree of turbulence in chamber 12. The aerosol absorbing medium in the turbulent stream together with the continuously wetted walls of chamber 12 provides an extremely large surface area and highly efficient vapor and aerosol particle absorption by the absorption liquid. The absorbing liquid is continuously recycled back through return tube 13, as described above, and air with aerosol and vapor now removed leaves venturi structure scrubbing chamber 12 and is exhausted as described regarding air exhaust in the embodiment described in FIGURE 1.

Sizes of all component structures described herein can be modified to be adaptable to a given application. While our apparatus was made of glass, any suitable material could be utilized, such as plastic.

It is obvious that other modifications can be made of our invention, and we desire our invention to be limited only by the scope of the appended claims.

We claim:

1. An improved separator for aerosol particles and vapor comprising an intake cone, means for drawing a main air stream at a constant rate through said intake cone, a probe means within and substantially coaxial with said inlet cone, means for separating the aerosol particles, and means for exhausting air from which the aerosol particles have been removed wherein the improvement is the separator means comprising a first inlet means being connected to said probe means; an air exhaust chamber located below said inlet means and integral with the inlet means; a tapered ground glass joint means located below said air exhaust chamber and integral with the chamber, said joint means being mated within a ground glass opening means; an elongated absorption chamber means containing a body of absorption liquid and having one end closed and the opposite end open, the open end being ground glass and receiving said joint means; a trap means integral with said absorption chamber means and located adjacent to the open end of the absorption chamber; a first projection means integral with said absorption chamber means and located on the outer wall of said absorption chamber adjacent to the open end thereof, said first projection means having a spring means fastened thereto; a second projection means integral with said air exhaust chamber and located on the outer wall of said exhaust chamber adjacent to said joint means, said second projection means having a spring means fastened thereto; a spring means being fastened to said first and second projection means and retaining said joint means within said opening means; an elongated inlet tube means within said air exhaust chamber means and integral with said inlet means, said inlet tube means being extended within said absorption chamber means to a location below said trap means but terminating above said absorption liquid, and a means creating turbulent flow integral with said inlet tube means and located at the end of said tube means opposite to the inlet means, said turbulent flow means extending to a location adjacent to the closed end of said absorption chamber.

2. The separator of claim 1 wherein the turbulent flow means comprises a coiled tube.

3. The separator of claim 1 wherein the turbulent flow means comprises a venturi structure integral with the inlet tube means, the constricted portion of said venturi structure being located below the trap means and above the closed end of said absorption chamber; a second inlet means integral with said inlet tube means and adjacent said constricted portion of the venturi structure; an elongated scrubbing chamber integral with the constricted portion of the venturi structure and extending to a location adjacent to the closed end of the absorption chamber; and an elongated recycle tube means integral with said second inlet means extending in a plane parallel to the plane of said scrubbing chamber to a location adjacent to the closed end of said absorption chamber, absorption liquid being recycled through said scrubbing chamber by said recycle tube means.

4. A bubbler type absorber for separating aerosol particles and vapor from air comprising a first inlet means connected to said probe means; an air exhaust chamber located below said inlet means and integral with the inlet means; a tapered ground glass joint means located below said air exhaust chamber and integral with the chamber, said joint means being mated within a ground glass opening means; an elongated absorption chamber means containing a body of absorption liquid and having one end closed and the opposite end open, the open end being ground glass and receiving said joint means; a trap means integral with said absorption chamber means and located adjacent to the open end of the absorption chamber; a first projection means integral with said absorption chamber means and located on the outer wall of said absorption chamber adjacent to the open end thereof, said first projection means having a spring means fastened thereto; a second projection means integral with said air exhaust chamber and located on the outer wall of said exhaust chamber adjacent to said joint means, said second projection means having a spring means fastened thereto; a spring means being fastened to said first and second projection means and retaining said joint means within said opening means; an elongated inlet tube means within said air exhaust chamber means and integral with said inlet means, said inlet tube means extending within said absorption chamber means to a location below said trap means but terminating above said absorption liquid; and a means creating turbulent flow integral with said inlet tube means and located at the end of said tube means opposite to the inlet means, said turbulent flow means extending to a location adjacent to the closed end of said absorption chamber.

5. The absorber of claim 4 wherein the turbulent flow means comprises a coiled tube.

6. The absorber of claim 4 wherein the turbulent flow means comprises a venturi structure integral with the inlet tube means, the constricted portion of said venturi structure being located below the trap means and above the closed end of said absorption chamber; a second inlet means integral with said inlet tube means and adjacent said constricted portion of the venturi structure; an elongated scrubbing chamber integral with the constricted portion of the venturi structure and extending to a location adjacent to the closed end of the absorption chamber; and an elongated recycle tube means integral with said second inlet means extending in a plane parallel to the plane of said scrubbing chamber to a location adjacent to the closed end of said absorption chamber, absorption liquid being recycled through said scrubbing chamber by said recycle tube means.

7. A method of separating aerosol particles and vapor of low concentration from air comprising the steps of providing an inlet means for air containing aerosol particles and vapor; providing an absorption chamber means, said absorption chamber means containing absorption liquid for said vapor; providing turbulent flow means, said flow means creating a large surface area for absorption of vapor and removal of aerosol particles; providing an exhaust means to exhaust the air from which aerosol particles and vapor have been removed; placing absorbing liquid within said absorption chamber and below said turbulent flow means; flowing a stream of air containing aerosol particles and vapor through said inlet means into said turbulent flow means; creating turbulent flow in the airstream containing aerosol particles and vapor; imparting turbulent flow to the absorption liquid by the airstream turbulent flow; removing aerosol particles within the turbulent flow means by the turbulent flow; creating a larger surface area as a result of the turbulent flow; absorbing the vapor in the absorbing liquid; exhausting air, the aerosol particles and vapor having been removed from the exhausted air; continuing the airstream flow for a predetermined sample period of time; stopping the airstream flow; and analyzing the absorption liquid to determine the airstream aerosol particles and vapor content.

8. The method of claim 7 wherein the turbulent flow means comprises a coiled tube.

9. The method of claim 7 wherein the turbulent flow means comprises a venturi structure integral with the inlet tube means, the constricted portion of said venturi structure being located below the trap means and above the closed end of said absorption chamber; a second inlet means integral with said inlet tube means and adjacent said constricted portion of the venturi structure; an elongated scrubbing chamber integral with the constricted portion of the venturi structure and extending to a location adjacent to the closed end of the absorption chamber; and an elongated recycle tube means integral with said second inlet means extending in a plane parallel to the plane of said scrubbing chamber to a location adjacent to the closed end of said absorption chamber, absorption liquid being recycled through said scrubbing chamber by said recycle tube means.

References Cited

UNITED STATES PATENTS

| | | | |
|---|---|---|---|
| 1,526,170 | 2/1925 | Milligan | 261—121 |
| 1,541,853 | 6/1925 | Rottmann | 261—121 |
| 2,368,204 | 1/1945 | Dannenbaum | 23—259 |
| 3,001,402 | 9/1961 | Koblin | 73—421.5 |
| 3,103,471 | 9/1963 | Asami | 23—292 |

REUBEN FRIEDMAN, Primary Examiner

C. N. HART, Assistant Examiner

U.S. Cl. X. R.

55—95; 73—29